(12) United States Patent
Wu

(10) Patent No.: US 9,091,394 B2
(45) Date of Patent: Jul. 28, 2015

(54) TRIPOD WITH ADJUSTABLE LEG

(71) Applicant: HON HAI PRECISION INDUSTRY CO., LTD., New Taipei (TW)

(72) Inventor: Cheng-Shiun Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/972,860

(22) Filed: Aug. 21, 2013

(65) Prior Publication Data
US 2014/0231601 A1  Aug. 21, 2014

(30) Foreign Application Priority Data
Feb. 20, 2013  (TW) .............................. 102105809 A

(51) Int. Cl.
| | |
|---|---|
| F16M 13/00 | (2006.01) |
| G03B 17/00 | (2006.01) |
| F16M 11/18 | (2006.01) |
| G03B 17/56 | (2006.01) |
| F16M 11/04 | (2006.01) |
| F16M 11/14 | (2006.01) |
| F16M 11/06 | (2006.01) |

(52) U.S. Cl.
CPC ............ *F16M 11/18* (2013.01); *F16M 11/041* (2013.01); *F16M 11/14* (2013.01); *G03B 17/561* (2013.01); *F16M 11/06* (2013.01)

(58) Field of Classification Search
USPC .......................... 248/422; 396/428; D16/244
See application file for complete search history.

(56) References Cited

U.S. PATENT DOCUMENTS

| | | | | | |
|---|---|---|---|---|---|
| 1,278,730 | A | * | 9/1918 | Oliver | 248/591 |
| 1,335,736 | A | * | 4/1920 | Jackson | 474/81 |
| 1,407,201 | A | * | 2/1922 | Kirby | 68/35 |
| 1,463,446 | A | * | 7/1923 | Snowden | 396/428 |
| 1,764,721 | A | * | 6/1930 | Hayden | 248/186.2 |
| 2,439,194 | A | * | 4/1948 | Wild | 248/181.1 |
| 2,508,122 | A | * | 5/1950 | Mooney | 248/404 |
| 3,211,405 | A | * | 10/1965 | Fey et al. | 248/183.2 |
| 3,622,112 | A | * | 11/1971 | Stroh | 248/181.1 |
| 3,677,509 | A | * | 7/1972 | O'Connor | 248/187.1 |
| 3,782,671 | A | * | 1/1974 | Igwe | 248/183.4 |
| 3,949,185 | A | * | 4/1976 | Roach | 219/69.1 |
| 4,019,710 | A | * | 4/1977 | O'Connor et al. | 248/181.2 |
| 4,135,305 | A | * | 1/1979 | Krause | 33/570 |

(Continued)

FOREIGN PATENT DOCUMENTS

JP       10055020 A  *  2/1998  ............ G03B 17/56

*Primary Examiner* — Jonathan Liu
*Assistant Examiner* — Chiedu Chibogu
(74) *Attorney, Agent, or Firm* — Novak Druce Connolly Bove + Quigg LLP

(57) ABSTRACT

A tripod includes a platform, a connecting element, a leg element, and an operation element. The platform includes a bottom surface, and a first bevel gear extending downward from the bottom surface. The connecting element includes an upper end, a lower end opposite to the upper end, and a side surface connected between the upper end and the lower end. The connecting element is connected to a center of the platform, and defines a spherical cavity on the side surface. The leg element is connected to the lower end of the connecting element. The operation element includes a spherical body, a second bevel gear, and an adjustable leg. The spherical body and the adjustable leg respectively connected to two opposite ends of the second bevel gear. The spherical body is rotatably received in the spherical cavity, and the second bevel gear engages with the first bevel gear.

8 Claims, 3 Drawing Sheets

(56) References Cited

U.S. PATENT DOCUMENTS

| | | | |
|---|---|---|---|
| 4,281,566 A * | 8/1981 | Brusasco | 475/164 |
| 4,566,663 A * | 1/1986 | Barchus | 248/324 |
| 4,655,472 A * | 4/1987 | Pletscher | 280/303 |
| 5,930,544 A * | 7/1999 | Tseng et al. | 396/529 |
| 6,027,257 A * | 2/2000 | Richards et al. | 396/428 |
| 6,084,666 A * | 7/2000 | Kindwall et al. | 356/244 |
| 6,254,044 B1 * | 7/2001 | Lee | 248/177.1 |
| 6,279,860 B1 * | 8/2001 | Swanger | 248/125.2 |
| 6,364,270 B1 * | 4/2002 | Kamei | 248/354.1 |
| 6,467,738 B1 * | 10/2002 | Hedrick et al. | 248/164 |
| 7,556,227 B2 * | 7/2009 | Thuelig | 248/188.8 |
| 8,221,008 B2 * | 7/2012 | Kimura | 396/428 |
| 8,313,071 B2 * | 11/2012 | Huang | 248/276.1 |
| 8,360,663 B1 * | 1/2013 | Lin | 396/428 |
| 8,387,938 B2 * | 3/2013 | Lin | 248/456 |
| 8,528,868 B2 * | 9/2013 | Leung | 248/125.8 |
| 8,757,564 B2 * | 6/2014 | Huang | 248/184.1 |
| 8,818,534 B2 * | 8/2014 | Wang et al. | 700/57 |
| 2006/0089626 A1 * | 4/2006 | Vlegele et al. | 606/1 |
| 2007/0170320 A1 * | 7/2007 | Sun | 248/177.1 |

\* cited by examiner

TRIPOD WITH ADJUSTABLE LEG

BACKGROUND

1. Technical Field

The present disclosure relates to tripods and, particularly, to a tripod having an adjustable leg.

2. Description of Related Art

Tripods are used to support cameras for steady imaging. However, stability of imaging is still adversely affected when using the tripod in complex terrain environment conditions.

Therefore, it is desirable to provide a tripod, which can overcome the limitations described.

DETAILED DESCRIPTION

Embodiments of the disclosure will be described with reference to the drawings.

Figure 1:
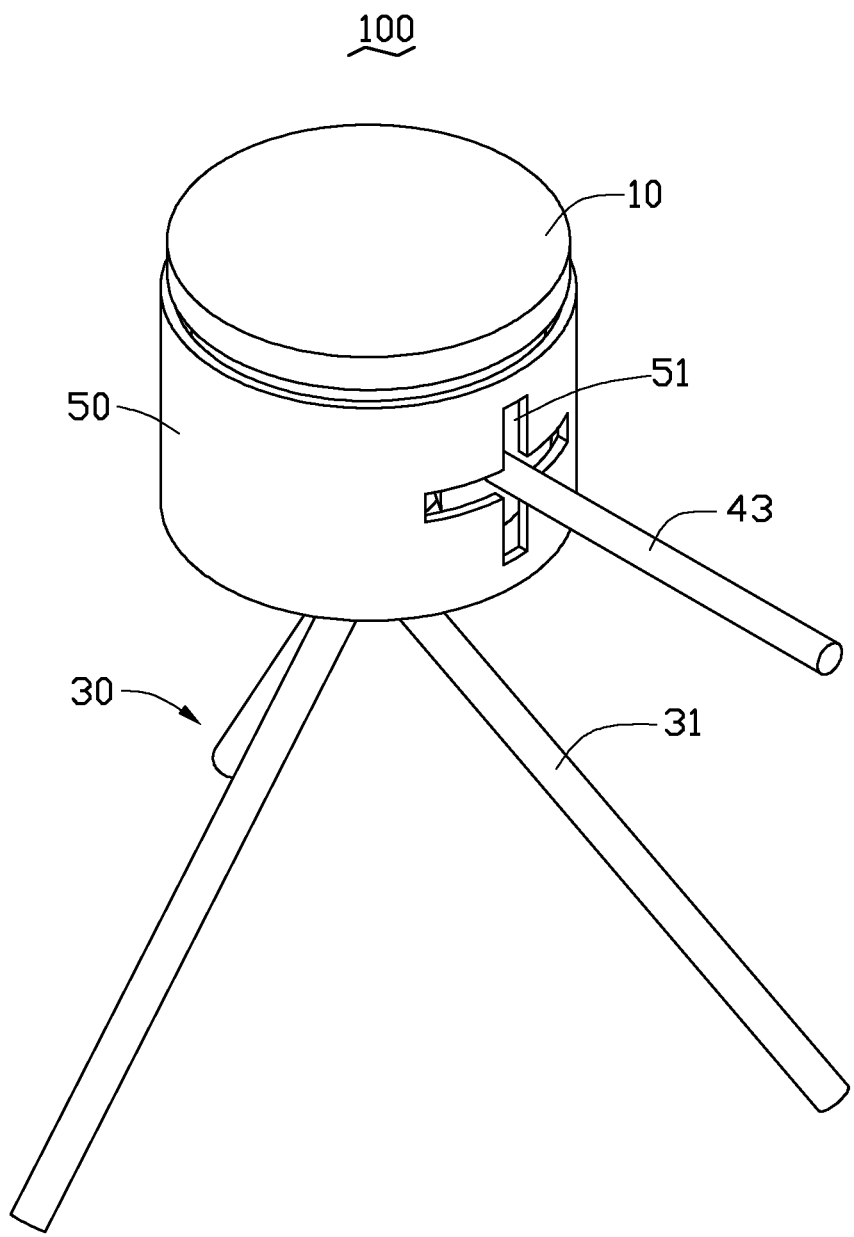
FIG. 1 is an isometric view of a tripod in accordance with an exemplary embodiment.
Figure 2:
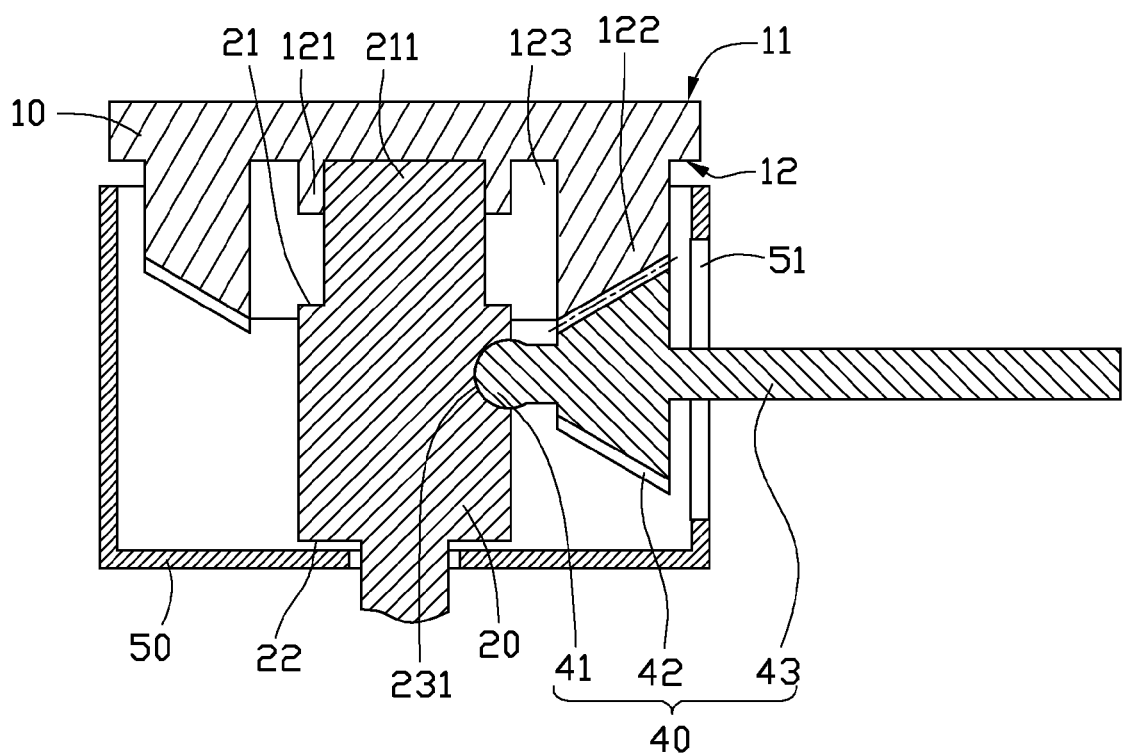
FIG. 2 is a cross-sectional view of the tripod of FIG. 1, rotated by an adjustable leg.
Figure 3:
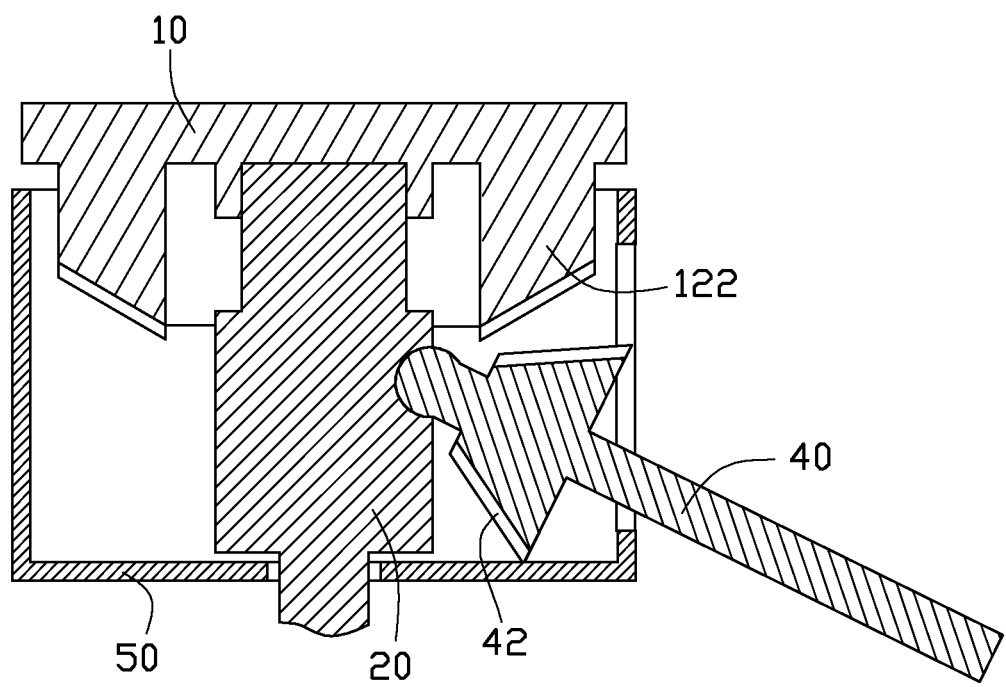
FIG. 3 is a cross-sectional view of the tripod of FIG. 1, supported by the adjustable leg.

FIGS. 1-3 show a tripod 100 according to an exemplary embodiment. The tripod 100 includes a platform 10, a connecting element 20, a leg element 30, an operation element 40, and a case 50. The tripod 100 is used to support and allow rotation of a camera (not shown).

The platform 10 is substantially a circular plate, and includes a bearing surface 11 and a bottom surface 12 opposite to the bearing surface 11. The camera is supported on the bearing surface 11. An axle seat 121 extends downward from a center of the bottom surface 12. A first bevel gear 122 extends downward from an edge of the bottom surface 12. The first bevel gear 122 is annular shaped, and defines a hole 123 in a center. The axle seat 121 is received in the hole 123. The first bevel gear 122 is a straight bevel gear, and includes a number of gears 1221. An external diameter of the first bevel gear 122 is gradually decreased along a direction facing away from the bottom surface 12. In the embodiment, the first bevel gear 122 is a straight bevel gear.

The connecting element 20 is cylindrical and includes an upper end 21, and a lower end 22 opposite to the upper end 21, and a side surface 23 connected between the upper end 21 and the lower end 22. An axle 211 extends upward from the upper end 21, and is rotatably received in the axle seat 121. The connecting element 20 defines a spherical cavity 231 on the side surface 23. In the embodiment, the spherical cavity 231 is spherical cap shaped.

The leg element 30 is connected to the lower end 22 of the connecting element 20, and includes three supporting legs 31. The three supporting legs 31 are rotatably connected to one same end, and can be simultaneously adjusted to an incline angle. The position of the supporting legs 31 away from a vertical centre allows the leg element 30 better leverage for resisting lateral forces.

The operation element 40 includes a spherical body 41, a second bevel gear 42, and an adjustable leg 43. The spherical body 41 and the adjustable leg 43 are respectively positioned at two opposite ends of the second bevel gear 42. The spherical body 41 is received in the spherical cavity 231. The second bevel gear 42 engages with the first bevel gear 122. An external diameter of the spherical body 41 is slightly less than an internal diameter of the spherical cavity 231. The second bevel gear 42 is a straight bevel gear, and includes a number of gears 421. The number of the gears 421 of the second bevel gear 42 is equal to the number of the gears 1221 of the first bevel gear 122. An external diameter of the second bevel gear 42 is gradually increased from the spherical body 41 to the adjustable leg 43. The external diameter of the spherical body 41 is less than the least external diameter of the second bevel gear 42.

The case 50 is hollow-shaped, and defines a guiding slot 51 on a side. The guiding slot 51 is cross-shaped. The case 50 is positioned on the leg element 30. The first bevel gear 122, the connecting element 20, and the operation element 40 are received in the case 50. The adjustable leg 43 penetrates the case 50 from the guiding slot 51. The platform 10 protrudes from a top end of the case 50.

The length of the adjustable leg 43 is equal to the length of the supporting legs 31 of the leg 30. In order to increase the length of the adjustable leg 43, the adjustable leg 43 can be designed as an extension-type.

In other embodiment, the axle seat 121 can be formed on the connecting element 20. The axle 211 extends downward from the bottom surface 12 of the platform 10. The platform 10 is rotatably connected to the connecting element 20.

In other embodiment, the external diameter of the first bevel gear 122 is gradually increasing along a direction facing away from the bottom surface 12, and the external diameter of the second bevel gear 42 is decreasing from the spherical body 41 to the adjustable leg 43. The shape of the first bevel gear 122 is corresponding with the shape of the second bevel gear 42.

In use, when the platform 10 needs to be rotated, the adjustable leg 43 is moved along a direction perpendicular to the platform 10 in the guiding slot 51. After the second bevel gear 42 engages with the first bevel gear 41, the adjustable leg 43 is moved along a circular direction of the platform 10 in the guiding slot 51. The operation element 40 rotates the platform 10. When the platform 10 is rotated to a preset position, the adjustable leg 43 is moved along a direction perpendicular to the platform 10 in the guiding slot 51. After the second bevel gear 42 separates from the first bevel gear 41, the adjustable leg 43 of the operation element 40 can be treated as a fourth supporting leg of the leg element 30.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A tripod, comprising:
    a platform comprising a bottom surface, an axle seat extending downward from a center of the bottom surface, and a first bevel gear extending downward from the bottom surface, the first bevel gear being annular shaped and defining a hole in a center, the axle seat being received in the hole;
    a connecting element comprising an upper end, a lower end opposite to the upper end, a side surface connected between the upper end and the lower end, and an axle extending upward from the upper end and rotatably received in the axle seat; the connecting element connected to a center of the platform, and defining a spherical cavity on the side surface;
    a leg element connected to the lower end of the connecting element; and an operation element comprising a spherical body, a second bevel gear, and an adjustable leg; the spherical body and the adjustable leg respectively connected to two opposite ends of the second bevel gear; the spherical body rotatably received in the spherical cavity, and the second bevel gear engaging with the first bevel gear.

2. The tripod of claim 1, wherein the first bevel gear and the second bevel gear are straight bevel gears.

3. The tripod of claim 2, wherein the number of the gears of the second bevel gear is equal to the number of the gears of the first bevel gear.

4. The tripod of claim 2, wherein an external diameter of the first bevel gear is gradually decreasing along a direction facing away the bottom surface, and an external diameter of the second bevel gear is gradually increasing from the spherical body to the adjustable leg.

5. The tripod of claim 1, comprising a case positioned on the leg element, and all of the first bevel gear, the connecting element, and the operation element are received in the case, the platform protrudes from a top end of the case.

6. The tripod of claim 5, wherein the case defines a guiding slot on a side thereof, and the adjustable leg protrudes from the guiding slot.

7. The tripod of claim 6, wherein the guiding slot is cross-shaped.

8. The tripod of claim 1, wherein an external diameter of the spherical body is slightly less than an internal diameter of the spherical cavity.

* * * * *